(12) United States Patent
Orabona et al.

(10) Patent No.: US 12,519,842 B2
(45) Date of Patent: Jan. 6, 2026

(54) METHODS AND DEVICE FOR MANAGING LAWFUL INTERCEPTION

(71) Applicant: Telefonaktiebolaget LM Ericsson (publ), Stockholm (SE)

(72) Inventors: Luciano Orabona, Caserta (IT); Amedeo Imbimbo, Caivano (IT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 416 days.

(21) Appl. No.: 18/010,891

(22) PCT Filed: Jun. 18, 2020

(86) PCT No.: PCT/EP2020/067019
§ 371 (c)(1),
(2) Date: Dec. 16, 2022

(87) PCT Pub. No.: WO2021/254630
PCT Pub. Date: Dec. 23, 2021

(65) Prior Publication Data
US 2023/0254347 A1    Aug. 10, 2023

(51) Int. Cl.
*H04L 9/40* (2022.01)
*H04W 12/63* (2021.01)
*H04W 12/80* (2021.01)

(52) U.S. Cl.
CPC ........... *H04L 63/306* (2013.01); *H04W 12/63* (2021.01); *H04W 12/80* (2021.01)

(58) Field of Classification Search
CPC ...... H04L 63/306; H04W 12/63; H04W 12/80
See application file for complete search history.

(56) References Cited

PUBLICATIONS

International Search Report and Written Opinion issued in International Application No. PCT/EP2020/067019 dated Nov. 24, 2020 (15 pages).
3GPP TS 33.107 V15.6.0 (Jun. 2019). 3rd Generation Partnership Project; Technical Specification Group Services and System Aspects; 3G security; Lawful interception architecture and functions (Release 15), Jun. 2019 (386 pages).
ETSI TS 133 107 V15.5.0 (May 2019), Universal Mobile Telecommunications System (UMTS); LTE; Digital cellular telecommunications system (Phase 2+) (GSM); 3G security; Lawful interception architecture and functions (3GPP TS 33.107 version 15.5.0 Release 15), May 2019 (406 pages).
3GPP TS 33.108 V15.5.0 (Jun. 2019), 3rd Generation Partnership Project; Technical Specification Group Services and System Aspects; 3G security: Handover interface for Lawful Interception (LI) (Release 15), Jun. 2019 (368 pages).

*Primary Examiner* — Ronald B Abelson
(74) *Attorney, Agent, or Firm* — Rothwell, Figg, Ernst & Manbeck, P.C.

(57) ABSTRACT

Methods and devices overcome the issue caused when target's location is not known at the beginning of a location dependent interception thereby being not possible to determine whether the target is in a law enforcement's agency jurisdiction. The network operator delivers lawful interception data encrypted to the law enforcement agency and provides the decryption information when jurisdiction is confirmed.

14 Claims, 9 Drawing Sheets

METHODS AND DEVICE FOR MANAGING LAWFUL INTERCEPTION

CROSS REFERENCE TO RELATED APPLICATIONS

This application is a 35 U.S.C. § 371 National Stage of International Patent Application No. PCT/EP2020/067019, filed 2020 Jun. 18.

TECHNICAL FIELD

The invention generally relates to lawful interception in a communication network.

BACKGROUND

Lawful interception, LI, is a process performed by a network operator that selectively forwards communication-related information of certain network users (called LI targets) to a law enforcement agency, LEA, with legal authorization (evidenced by warrants that specify the LI targets) to acquire such information.

Most countries require network operators to have lawful interception capability meeting specific requirements. Network operators are wireless communication service providers that own and control elements necessary to deliver (sell) services to end users (that may be mobile) including spectrum allocation, infrastructure, billing, etc. In order to meet the lawful interception requirements, network operators are configured to collect LI target's call-related information and (depending on the warrant, optionally also) communication content, to form this collected LI data, and then to deliver it to a LEA (actually to a device of LEA via the network). The call-related information, known as "intercept-related information," IRI, consists of information including destination of a call (e.g., called party's telephone number), source of a call (e.g., caller's phone number), time of the call, duration, etc. The communication content (CC) is the stream of data carrying the call. Communications between the network operator infrastructure and the LEA device are performed via secure handover interfaces (HI).

LI is location dependent if interception of an LI target is restricted to less than a network service area. For example, if the network service area crosses a national border, a network cell may cover areas in two or more countries which may have different LI requirements. In another example, a very small country may be completely inside a network cell and being just a fraction thereof, the network cell also covering territory of another country. It is not always economically convenient to duplicate nodes managing such cells and dissect cells' areas according to national borders. From an LI point of view, these scenarios are challenging because typically the intercepted traffic has to be sent only to the LEA where the LI target is located (i.e., to the LEA that has jurisdiction). In this case, the intercepted traffic must be filtered according to the target's location and delivered only to the LEA having jurisdiction. The 3GPP standards (e.g., 3GPP TS 33.107 v15.6.0) define Location Dependent Interception (LDI) as the interception of a target mobile that is restricted to one or several Interception Areas (IA) within a network service area.

Most network operators (NO) are configured to operate according to standardized LI architecture and functions. In the case of a circuit switched (CS) network, the location dependency check occurs at the establishment of each call. The LI administrative function (ADMF) sends (via an interface X1) the interception area (IA) where interception of the LI target is required, according to the warrant, to a CS node. The CS node then determines whether to deliver or not LI data to the LEA according to whether the LI target is in the IA at the establishment of the call (as ascertained based on the known target location).

In the case of a packet switched (PS) network, since the LI target's location information is received with other IRI, the location dependency check occurs at each session establishment or release, and at each routing area update, to determine the relevant IAs (and to deduce the possible LEAs within these IAs).

LI in the case of an IP Multimedia System (IMS) is not yet standardized because the intercepting node or administrative function may not know the LI target location when a session is initiated (i.e., an SIP INVITE message is received), so it cannot decide whether or not to intercept the session. In IMS, the location information is delivered in a PANI header, which is not necessarily provided when a session is initiated. In principle, the network operator node (e.g., deliver and mediation function) could buffer the LI data until acquiring the location information to determine whether to deliver it to a LEA; however, such an approach would be expensive and cumbersome. Alternatively, in a manner similar to the PS domain, in IMS the LI data may start being delivered only once an LI target's location information is acquired. However, in IMS, the absence of the first session message would prevent the LEA from decoding later messages due to missing information (such as the codecs transmitted in the Session Description Protocol, SDP, field). Thus, LDI is not executed in IMS domain currently, and it is not foreseen to be in the 3GPP standard because, absent LI target location information when a session is initiated, it cannot be determined whether LDI is to be performed.

SUMMARY

An object of the invention is to enable an improvement of privacy for an LI target in case of LI data being sent to more than one LEA or to an "non-authorized" LEA. Embodiments provide methods and devices for managing location dependent lawful interception when a target's location information may not be available when a communication session is initiated. One object of the inventions is to provide network operator's devices and methods adapted to encrypt the LI data (IRI and CC) before sending it to a device of a LEA that may be entitled to it. Upon acquiring a target's location information, these embodiments send also decryption information to the device of LEA, if determined that the LI target is within the LEA's jurisdiction. Another object of the inventions is to provide devices and methods adapted to manage such encrypted information on LEA's side. That is, the received encrypted LI data is stored and decrypted if decryption information is received or is discarded.

According to an embodiment, a method for managing location dependent LI is performed by a network operator device in a communication network. The method executes the following for each of one or more intercepted messages of a communication session related to an LI target: (1) if the intercepted message is identified as being a first message of the communication session, initializing an individual encryption mechanism, IEM, and an IEM version, (2) transmitting one or more LI messages related to the LI target to a law enforcement agency, LEA, device, each LI message including the IEM version, a communication session identifier and LI data extracted from the intercepted message, wherein the LI data is encrypted using the IEM; (3) if location information is extracted from the intercepted message, transmitting decryption information corresponding to the IEM to the LEA device if the location information indicates that the LI target is inside a specific geographical area, SGA, which is predefined for lawful interception by the LEA device, and updating the IEM and the IEM version; and (4) if the location information is not extracted from the intercepted message and the intercepted message is identified as being a last message of the communication session, transmitting the decryption information corresponding to the IEM to the LEA device if most recently intercepted location information of the LI target indicated that the LI target was inside the SGA or if no location information of the LI target was extracted from any of the one or more intercepted messages.

According to another embodiment there is a method for managing LI data received encrypted by a device associated with a LEA. The method includes storing encrypted LI data included in one or more LI messages received via a communication network, each LI message including an individual encryption mechanism version, LI session correlation information and the encrypted LI data, which has been encrypted using an individual encryption mechanism identified by the individual encryption mechanism version. The method also includes decrypting the encrypted LI data upon receiving decryption information corresponding to the individual encryption mechanism.

According to yet another embodiment, there is a network operator device for location dependent LI having a network interface and a processor connected to the network interface. The network interface is configured to receive one or more intercepted messages of a communication session related to an LI target and to transmit one or more LI messages to a LEA device via a network. The processor is configured to perform the following operations for each of the one or more intercepted messages: (1) if the intercepted message is identified as being a first message of the communication session, to initialize an IEM, and an IEM version, (2) to generate the one or more LI messages related to the LI target to be sent to a LEA device by the interface, each of the one or more LI message including the IEM version, a communication session identifier and LI data extracted from the intercepted message, wherein the LI data is encrypted using the IEM, (3) to generate a message with decryption information corresponding to the IEM to be transmitted to the LEA device by the interface if location information, which is extracted from the intercepted message, indicates that the LI target is inside an SGA, that is predefined for lawful interception by the LEA device, and then to update the IEM and the IEM version, and (4) if the location information is not extracted from the intercepted message and the intercepted message is identified as being a last message of the communication session, to generate a message with the decryption information corresponding to the IEM to be transmitted to the LEA device if most recently extracted location information of the LI target indicated that the LI target was inside the SGA or if no location information of the LI target was extracted from any of the intercepted message.

According to yet another embodiment, there is a computer-readable storage medium containing a computer-readable code that when read by a processor causes the processor to perform a method for managing location dependent LI by a network operator device in a communication network. The method executes the following for each of one or more intercepted messages of a communication session related to an LI target: (1) if the intercepted message is identified as being a first message of the communication session, initializing an individual encryption mechanism, IEM, and an IEM version, (2) transmitting one or more LI messages related to the LI target to a law enforcement agency, LEA, device, each of the one or more LI messages including the IEM version, a communication session identifier and LI data extracted from the intercepted message, wherein the LI data is encrypted using the IEM; (3) if location information is extracted from the intercepted message, transmitting decryption information corresponding to the IEM to the LEA device if the location information indicates that the LI target is inside a specific geographical area, SGA, which is predefined for lawful interception by the LEA device, and updating the IEM and the IEM version; and (4) if the location information is not extracted from the intercepted message and the intercepted message is identified as being a last message of the communication session, transmitting the decryption information corresponding to the IEM to the LEA device if most recently extracted location information of the LI target indicated that the LI target was inside the SGA or if no location information of the LI target was extracted from any of the intercepted messages.

According to another embodiment, there is a network operator device for location dependent LI. The network operator device has an interface module configured to receive LI intercepted messages and an encryption module configured to initialize and update an IEM and an IEM version. The device also has a decision module configured to configured to determine whether any of intercepted one or more messages is a first or a last message of the communication session, whether the location information is present, and whether, according to the location information, the target is inside LEA's jurisdiction. Further, the device has an executive module configured, for each of the one or more intercepted messages, to generate one or more LI messages, each LI message including the IEM version, a communication session identifier and LI data extracted from the intercepted, wherein the LI data is encrypted using the IEM. The executive module is further configured (1) if, according to the decision module, the intercepted message is the first message of the communication session, to cause the encryption module to initialize the IEM and the IEM version, (2) if, according to the decision module, the location information is extracted from the intercepted message and if the location information indicates that the LI target is inside the LEA's jurisdiction, to transmit the decryption information corresponding to the IEM to the LEA device, and to cause the encryption module to update the IEM and the IEM version, and (3) if, the location information is not extracted from the intercepted message and, according to the decision module, the intercepted message is the last message of the communication session, to transmit the decryption information corresponding to the IEM to the LEA device if most recently extracted location information of the LI target indicated that the LI target was inside the LEA's jurisdiction or if no location information of the LI target was extracted from any of the one or more intercepted messages.

According to yet another embodiment there is a computer program comprising instructions which, when executed when executed by a network operator device, cause the network operator device to carry out a method for managing location dependent LI as described above.

According to another embodiment there is a device pertaining to a LEA and configured to manage encrypted LI data, the device having a communication interface and a processor connected to the communication interface. The communication interface is configured to receive LI messages and decryption information, each of the LI messages includes an individual encryption mechanism version, a communication session identifier and encrypted LI data. The processor is configured to store the encrypted LI data in a memory and to decrypt the encrypted LI data using the decryption information.

According to yet another embodiment, there is a computer-readable storage medium containing a computer-readable code that when read by a processor causes the processor to perform a method for managing LI data received encrypted at a LEA device. The method includes storing encrypted LI data included in one or more LI messages received via a communication network, each LI message including an individual encryption mechanism version, LI correlation information and the encrypted LI data, which has been encrypted using an individual encryption mechanism identified by the individual encryption mechanism version. The method also includes decrypting the encrypted LI data upon receiving decryption information corresponding to the individual encryption mechanism.

According to another embodiment, there is a device for managing encrypted LI data for a LEA. The device has an interface and a processing module. The interface is configured to receive LI messages and decryption information, each LI message including an IEMV, LI correlation information and the ELID, which has been encrypted using an individual encryption mechanism identified by the IEMV. The processing module is configured to store ELID and to decrypt ELID using the decryption information.

According to another embodiment, there is a computer program including instructions which, when executed by a law enforcement agency device, cause the at least one law enforcement agency device to carry out a method for managing LI data received encrypted at a LEA device as described above.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The meanings of some abbreviations used in this document are explained below:

3GPP 3$^{rd}$ Generation Partnership Project
ADMF Administration Function
CC Content of Communication
CN Correlation Number
CS Circuit Switched
CSCF Call Session Control Function
DF Delivery Function
DF2 Delivery Function for IRI
DF3 Delivery Function for CC
DK Decryption Key
ELID Encrypted Lawful Interception Data
GGSN Gateway GPRS Support Node
GMSC Gateway MSC Server
GPRS General Packet Radio Service
HI (Lawful Intercept) Handover Interface
HI2 (Lawful Intercept) Handover Interface for IRI reporting
HI3 (Lawful Intercept) Handover Interface for CC reporting
HLR Home Location Register
IA Interception Area
IEM Individual Encryption Mechanism
IEMV Individual Encryption Mechanism Version
IMEI International Mobile Equipment Identity
IMS IP Multimedia Subsystem
IMSI International Mobile Subscriber Identity
ICE Intercepting Control Element
IRI Intercept Related Information
LEA Law Enforcement Agency
LEMF Law Enforcement Monitoring Function
LDI Location dependent Interception
LI Lawful Interception
MF Mediation Function
MF2 Mediation Function for IRI reporting
MF3 Mediation Function for CC reporting
MSC Mobile Services Switching Center
MSISDN Mobile Subscriber Integrated Services Digital Network Number
NE Network Element
NO Network Operator
NWO Network Operator
PANI P-Access-Network-Info
PS Packet Switched
SIM Subscriber Identity Module
SDP Session Description Protocol
SHA Secure Hash Algorithm
SGA Specified Geographic Area
SGSN Serving GPRS Support Node
SIP Session Initiation Protocol
UE User Equipment
UICC Universal Integrated Circuit Card The following description of the embodiments refers to the accompanying drawings. The same reference numbers in different drawings identify the same or similar elements. The following detailed description does not limit the invention. Instead, the scope of the invention is defined by the appended claims. The embodiments to be discussed next focus on IMS, but the current approach may be extended to other arrangements in which location information is not available when a communication that may be subject to LI is initiated.

Reference throughout the specification to "one embodiment" or "an embodiment" means that a particular feature, structure or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

As described in the Background section, there are problems associated with location dependent interception when location information is not available at the beginning of a communication (e.g., call or session) that may be subject to LI. If an LI target specified in a warrant is a party in the communication and, therefore, the LI data is supposed to be intercepted as long as the LI target is in a specified geographic area (SGA) associated with the LEA (the SGA being less than the cell served area), absent the LI target's location information, the network operator's device in charge with LI cannot determine whether or not to forward LI data (e.g., IRI and CC) to the LEA device. The solution implemented in embodiments described hereinafter employs sending LI data encrypted to the LEA device (i.e., hardware, such as a computer, associated with the LEA that may execute a standardized or modified law enforcement monitoring function, LEMF). Such a device may be located in a law enforcement monitoring facility pertaining to the LEA, that may also house storage devices and other hardware and software resources used for analyzing LI data. Decryption information is selectively sent to the LEA device if, when the LI target's location information becomes available, it indicates that the LI target is within the SGA.

A public official (e.g., a judge) may authorize a network user's investigation, thereby allowing to activate lawful interception of their communications. The authorization paper known as a "warrant", which is provided to the LEA, is converted in digital form identifying an LI target corresponding to the investigated user and the extent of interception (e.g., the type of information intercepted). The LI target is identified by at least one of the following: International Mobile Subscriber Identity (IMSI), International Mobile Equipment Identity (IMEI), and Mobile Subscriber Integrated Services Digital Network Number (MSISDN). Each of these codes may univocally identify the user within the network. In particular, IMSI is a numeric code memorized in a UICC, which IMSI digits identify both the UICC/eUICC/iUICC itself and the mobile network in which the traffic is flowing. IMEI is an alphanumeric code uniquely identifying a mobile phone. MSISDN is the telephone number associated with a UICC/eUICC/iUICC and/or a subscription profile installed thereon as part of e.g. a USIM or ISIM, in a communication device like a mobile phone. The LI standard architecture includes an Intercepting Control Element (ICE) providing the user equipment (UE) of the target user with an access to the telecommunications network. An ICE could be interpreted by a Home Location Register (HLR), which is a central database that contains details of each mobile phone subscriber authorized to use the network. The HLR particularly stores details of every subscriber UICC/sim card issued by a mobile phone operator. ICEs may also be, among others, a Mobile Services Switching Center (MSC) Server, a Gateway MSC Server (GMSC), a Serving GPRS Support Node (SGSN), a Gateway GSN (GGSN). The ICE may also be a Home Subscriber Server (HSS), a User Profile Server Function (UPSF) and a Unified Data Management (UDM) or any future function installed an a network device for services for e.g. subscriber data management, User Equipment context management, User Equipment authentication, Event Exposure and parameter provision in a 3GPP network. The HSS is especially applicable as a component of an IMS network. Other ways of identifying an LI target may be employed as appropriately.

Figure 1:
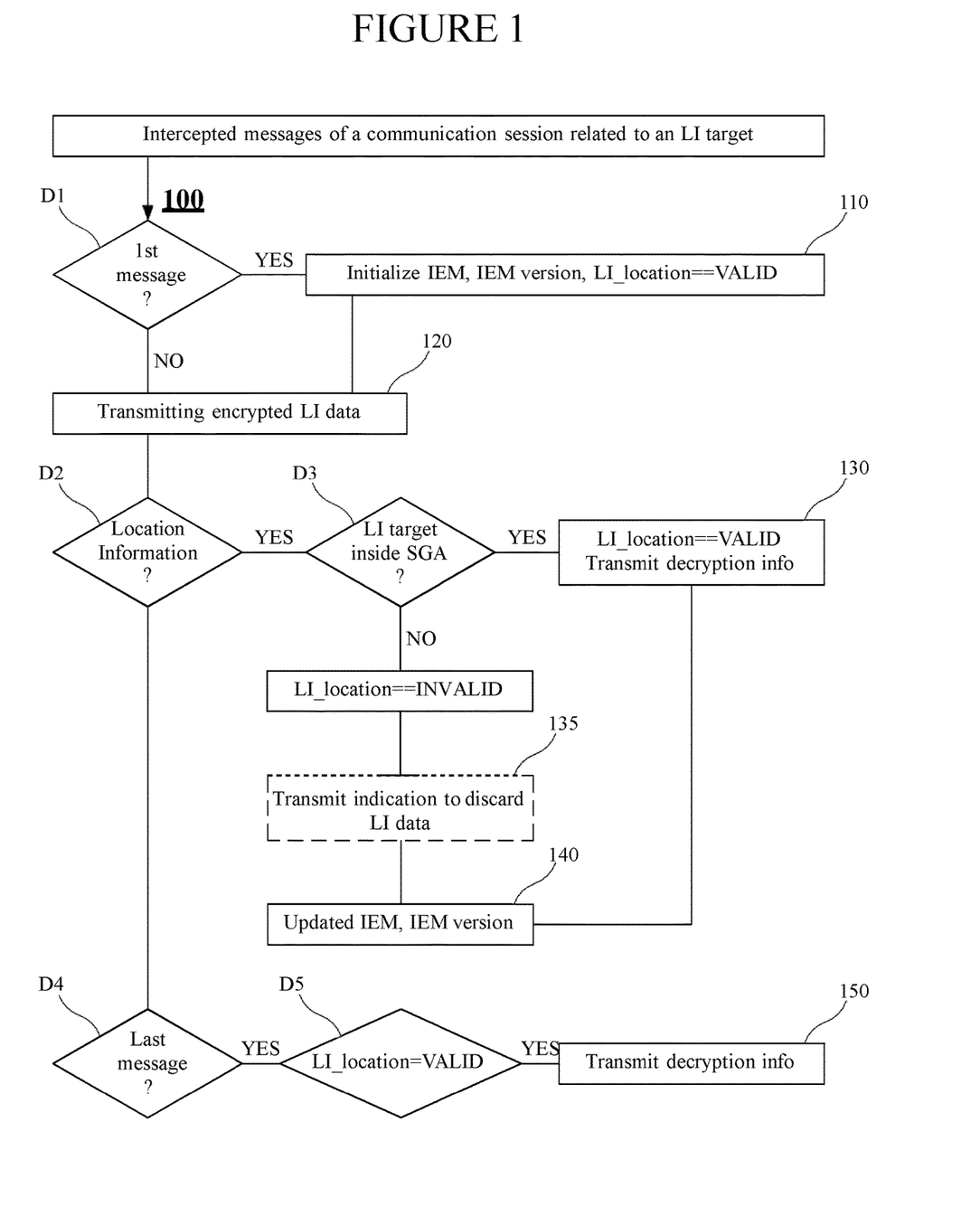
FIG. 1 illustrates a flowchart of a method according to an embodiment.

FIG. 1 illustrates the flowchart of a method for managing LDI according an embodiment. A network operator (NO) device takes different actions (110-150) for each of one or more intercepted messages of a communication session related to an LI target. Here, the messages are intercepted in a process parallel and independent from the method performed by the NO device. The intercepted messages are an input provided to the NO device performing the method.

If an intercepted message is identified as being the first message of the communication session (condition tested in block D1), then an individual encryption mechanism, IEM, and an associated IEM version, IEMV, are initialized at 110. The message being the first in a communication session may be determined, for example, if one of the parties in the communication sends a SIP INVITE message. An encryption mechanism is initialized by generating the encryption key or keys as appropriate. The keys are generated automatically by the NO device, for example, using a random generator, a cryptographic hash function in the form of a key derivation function in the form of a pseudo-random function/one-way key derivation function like, e.g., SHA256 and SHA512 (here 256 and 512 indicates the key length), or extracting a key from a predefined list of keys. The generated key may have a predetermined length and meet predefined requirements (e.g., including letters and digits, special characters, etc.). The key is uniquely associated with a portion of the communication session; this correspondence, such as a one-to-one correspondence, of a group of LI messages (more about the groups is discussed later) with the encryption mechanism and the key (its name or version) is signaled by the use of the term "individual." The LI target's identifier (e.g. IMSI, IMEI) or a part thereof may be used as input in generating the encryption key. Alternately or additionally, a session identifier (e.g., the correlation number, CN) may be used to generate the encryption key. In addition a sequence number, SQN, may be used as additional input to the key derivation function. Further parameters may also be used as input.

The common types of encryption mechanisms are symmetric encryption and asymmetric encryption. Symmetric encryption mechanisms use the same key to encrypt and to decrypt the data. Asymmetric encryption mechanisms use public keys to encrypt the data and private keys to decrypt it.

There are many encryption mechanisms that differ from one another in the type of keys used, key length, size of data blocks encrypted, etc. For example, a block cipher in the form of Advanced Encryption Standard (AES) is a symmetric encryption algorithm that encrypts fixed blocks of data (of 128 bits) at a time. AES keys, which can be 128-, 192-, or 256-bit long, encrypt the data in 10, 12 and 14 rounds, respectively, each round consisting of several steps of substitution, transposition, mixing of plaintext, and more. In another example, Rivest-Shamir-Adleman (RSA) is an asymmetric encryption algorithm that is based on the product of two large prime numbers. Knowledge of these prime numbers is necessary to be able to decode the message successfully. RSA is often used in digital signatures.

On the other hand, the IEMV, which is an identifier of the encryption mechanism with the current key, is initialized, which means that it has assigned a distinct value or a name ("key name"). Thus, the initialized IEM and the IEMV are associated with the specific communication session related to the LI target at 110.

Further, any time an intercepted message of the communication session is received, one or more LI messages (e.g., a message including encrypted IRI, and a message including encrypted CC) related to the LI target is/are transmitted to the LEA device at 120. Here, each LI message includes the IEMV, a communication session identifier (e.g., a correlation number) and encrypted LI data. The LI data (e.g., IRI or CC) is extracted from the intercepted message and encrypted using the IEM. The IEMV and the communication session identifier are not encrypted.

If location information is also extracted from the intercepted message (D2-YES) and the location information indicates that the LI target is inside the SGA (D3-YES), decryption information corresponding to the IEM is transmitted to the LEA device at 130, and then the IEM and the IEMV are updated at 140. That is, a new key is generated for the IEM and a new value or name is assigned to IEMV (e.g., if IEMV was a number, the number may be incremented). Decryption information (e.g., the encryption/decryption key, or other information that enables the LEA device to retrieve the key) may be included in a message that also carries the IEMV and the communication session identifier. A flag LI_location is used in FIG. 1 to represent the result of D3: if the LI target is inside the SGA, LI_location is set ("=") to "VALID," otherwise (D3-NO) LI_location is set to "INVALID." Regardless of the outcome of D3, the IEM and the IEMV are updated at 140.

Depending on when target's location is received, a group of encrypted messages includes LI messages generated from the beginning of the session until receiving target's location, between consecutively receiving target's location, or from last time receiving the target's location to the end of the session. If no target location is received throughout the session, the group includes all the LI messages of the communication session.

Thus, to prevent the LEA device from decoding LI data received when the LI target is outside LEA's jurisdiction, new encryption key is generated for each group of LI messages (i.e., whenever LI target's location is received a group ends and another one starts, so another key is generated). The sequence number and incremented each time a new key is generated may also be used for generating the new key. The decryption information (e.g., the key(s) or information conducive to recovering the key(s)) is sent to the LEA device only if according to the LI target location, the LEA device has the right (i.e., jurisdiction) to decrypt the previously submitted LI data. Since the LEA device may receive several times decryption information for a communication session, it must be able to uniquely associate each of the received decryption information with the stored encrypted LI data. Timing may be used to identify this association. Alternately or additionally, the IEMV and the communication session identifier added to the decryption information may be used to identify the association.

Optionally (i.e., in one embodiment), if the location information indicates that the LI target is outside the SGA (D3-NO), an indication to discard encrypted LI data is transmitted instead to the LEA device at 135. However, as later discussed, even without receiving such an indication, the LEA device may discard encrypted LI data previously received if an LI message has a new IEMV different from the IEMV in a previous message, and decryption information has not been transmitted between these messages with different IEMVs.

If the location information is not extracted from the intercepted message (D2-NO) and the intercepted message is the last message of the communication session (D4-YES), then the decryption information corresponding to the IEM may be transmitted to the LEA at 150. The message being the last in a communication session may be determined if one of the parties in the communication sends a SIP BYE message. Alternative or additionally, the communication session may be considered terminated if no new message is received for a predetermined time interval. The transmission of decryption information occurs if LI_location is VALID (D5-YES). LI_location is VALID if the most recently intercepted location information of the LI target indicated that the LI target was inside the SGA. Since LI_location is set to VALID when the first message is detected at 110, if no location information of the LI target is extracted from any of the intercepted messages, then step 150 is executed when the last message of the session is detected.

Thus, for an ongoing session of an LI target, the network operator device maintains communication session information, encryption/decryption information (including version) and an LI_location flag, but does not buffer LI data that is encrypted and forwarded to a LEA. Moreover, in a manner similar to PS networks where the decision whether to continue forwarding LI data was reiterated at each routing area update, the communication session is segmented with each segment being encrypted with a different IEM (e.g., a different encryption/decryption key), and the LEA receives decryption information only if it is evidenced that the LI target was indeed in the LEA's jurisdiction (i.e., inside the SGA).

In the above discussion, it has been assumed that only one LEA has a warrant for the LI target, but it is possible for two LEAs with complementary territorial jurisdictions to pursue the same LI target. If the network operator device managing an LI does not know the LI target's location at the beginning of a communication session, the network operator device would then transmit encrypted LI data to both LEAs (e.g. two different LEA devices), providing decryption information as appropriate once the LI target's location information is received.

Figure 2:
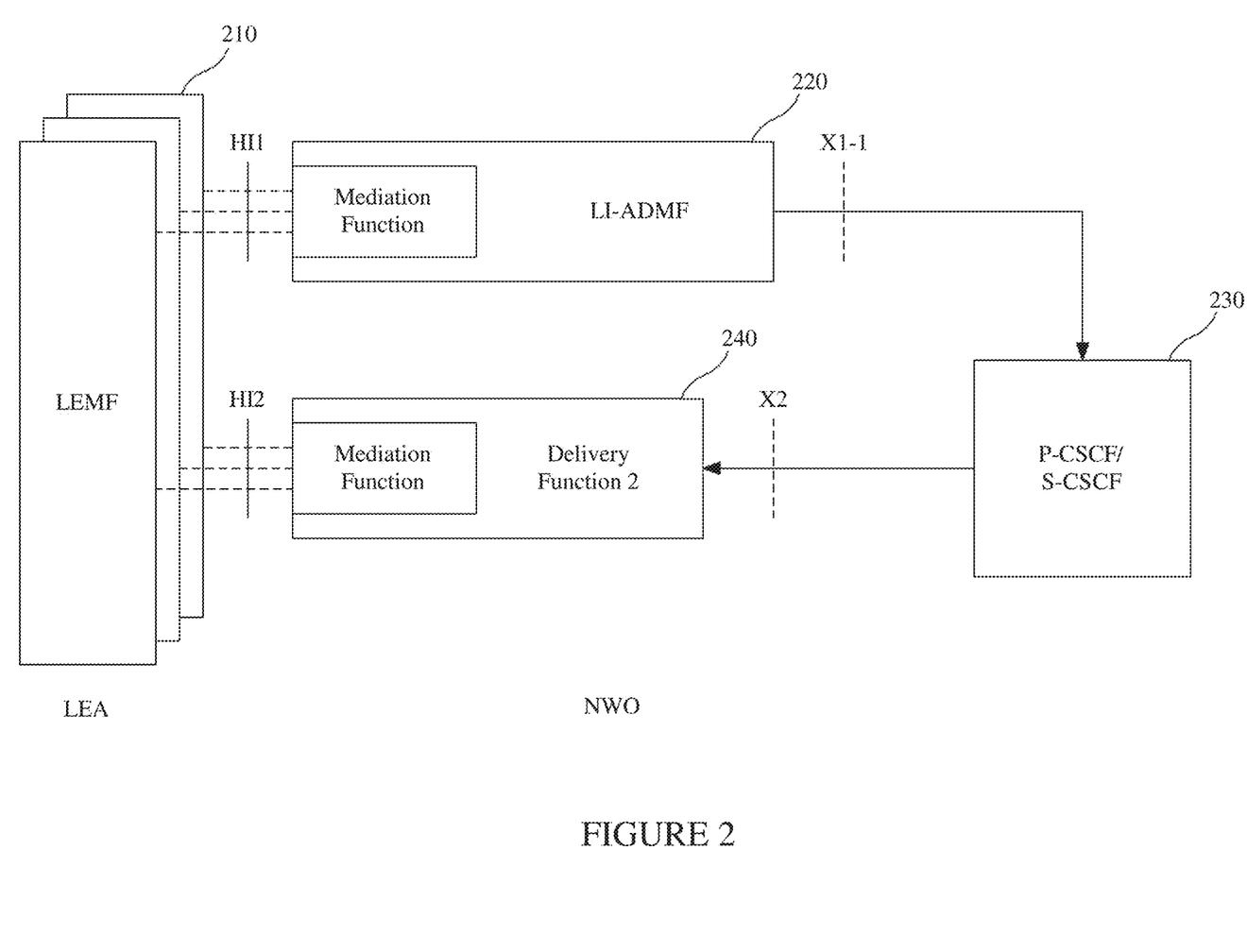
FIG. 2 shows an interception configuration in an IP Multimedia System (IMS)

As mentioned in the Background, one of the currently standardized network systems facing the problem of unavailability of location information at the beginning of a communication session is IMS. FIG. 2 (which is reproduced from 3GPP TS 33.107 v15.6.0) illustrates the functional architecture of IRI interception configuration in IMS. A network operator's administrative function (ADMF) 220, also called LI ADMF, receives a warrant for an LI target from a LEA device 210 that may be executing a law enforcement monitoring function (LEMF). LI ADMF 220 then prompts a call session control function (P-CSCF/S-CSCF) 230 to intercept all LI target-related messages (i.e., SIP messages). P-CSCF/S-CSCF 230 forwards the intercepted SIP messages to a delivery function 240. The delivery function 240 may be modified to incorporate the steps of method 100, or method 100 may be performed separately before the LI message with LI data extracted from the intercepted SIP messages is delivered to LEA device 210. Note that another function than P-CSCF/S-CSCF intercepts messages from which CC is extracted, and, therefore, the encrypted CC transmission within an LI message may be performed by another network element than the network element transmitting encrypted IRI within another LI message. In other words, all the communication-related session messages (SIP or otherwise are intercepted) and may be processed by differently to extract LI data.

Figure 3:
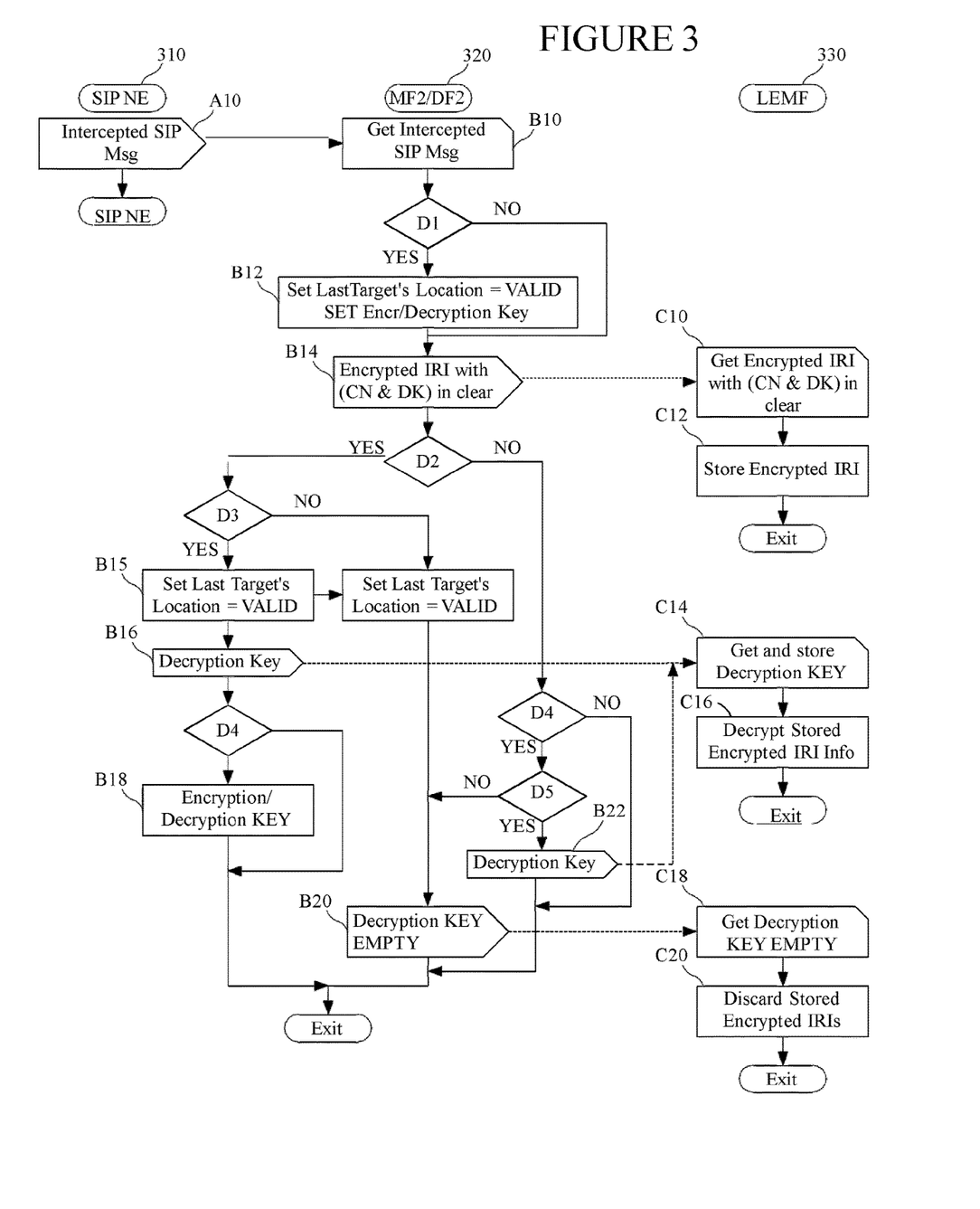
FIG. 3 is a flowchart illustrating IRI delivery in IMS according to an embodiment.

FIG. 3 is a flowchart illustrating IRI delivery in IMS according to an embodiment. This flowchart shows actions of three entities: the SIP intercepting network element 310, hereinafter called SIP NE 310, a modified IRI mediation/delivery function (MF2/DF2) 320 and a LEA device 330 executing a modified LEMF (hereinafter called "LEMF device 330") adapted to respond to the encryption mechanism. SIP NE 310 sends intercepted SIP messages to MF2/DF2 320 at A10. Note that from hardware point of view, SIP NE 310 may also execute MF2/DF2 320.

Upon receiving an intercepted SIP message from SIP NE 310 at B10, MF2/DF2 320 determines whether the message is the first message in the session at D1. If indeed the received message was the first message in the session, then MF2/DF2 320 sets a flag named "LastTarget's Location" to VALID and generates an encryption/decryption key of a symmetric encryption algorithm at B12. LastTarget's Location flag is similar to the LI_location flag in FIG. 1.

Then, at B14, MF2/DF2 320 sends an LI message to LEMF 330. The LI message includes encrypted IRI with a correlation number, CN, (that is a session identifier) and a decryption key name (DK) in clear (i.e., not encrypted). Upon receiving the LI message at C10, at C12 LEMF 330 stores the encrypted IRI with the respective CN that enables correlation of IRI and CC messages of the same session and DK that indicates the encryption version (similar to the IEM version in FIG. 1).

Further at D2, MF2/DF2 320 determines whether a PANI header has been received with the SIP message so that the target's location information is available in D2. If determined that the target's location information is available (D2-Y) then MF2/DF2 320 determines whether the target is located in the LEA's jurisdiction (i.e., in the SGA associated with the LEA) at D3. At B15, flag LastTarget's Location is set to VALID if the target is inside the jurisdiction and to INVALID if it is outside.

If determined that the target is inside the jurisdiction, then MF2/DF2 320 sends the current decryption key to LEMF 330 at B16. In one embodiment, MF2/DF2 320 does not send the encryption key but prompts LEMF to regenerate the key based on information it sends or it has been previously agreed. If, at D4, MF2/DF2 320 determines that the SIP message is not the last message in the session, it generates a new encryption/decryption key with another name at B18. If, however, at D3, MF2/DF2 320 has determined that the target is outside the jurisdiction, then it sends an empty decryption key to LEMF 330 at B20. An empty decryption key is an empty string. In another embodiment, no decryption information is submitted, but a new key with a new key version is used.

Upon receiving the decryption key at C14, the LEMF 330 decrypts the stored encrypted IRIs at C16. Receiving an empty decryption key (or another indication as discussed above) at C18 prompts LEMF 330 to discard the stored encrypted IRIs at C20.

Returning now to decision block D2, if the target's location information is available, then MF2/DF2 320 determines whether the current SIP message is the last message of the session at D4' (e.g., it is a BYE message) and takes no further action if determined it is not. If, however, the current SIP message is indeed the last message of the session (D4'-Y), then MF2/DF2 320 determines whether flagged LastTarget's Location is VALID at D5. Note that LastTarget's Location may have been set to VALID upon determining that the LI target was located in the LEA's jurisdiction at D3 or, if no location information was received, LastTarget's Location maintains its VALID value set in B12 after detecting the first message in the session. If at D5, it is determined that flag LastTarget's Location is VALID (D5-YES), then MF2/DF2 320 sends a decryption key to LEMF 330 at B22. In some embodiments, MF2/DF2 320 sends other decryption information enabling LEMF 330 to retrieve the key(s) necessary for decryption. Otherwise (i.e., D5-NO), MF2/DF2 320 sends an empty decryption key to LEMF 330 at B20.

To summarize, in IMS, since not all SIP messages include the target's location in the PANI header, each SIP message received from the intercepting network element is mediated by a modified MFD2/DF2 and delivered to a LEA with the included information encrypted, except for the identifier needed to correlate IRIs and CCs related to the same session and an encryption identifier. In this approach, the LEA, not the network operator, buffers LI data (encrypted as sent by MF2/DF2) until receiving the decryption key for decoding it. Upon acquiring the target's location from the PANI header of a SIP message, MF2/DF2 determines whether the LI target is located within the LEA's jurisdiction. In the affirmative case, MF2/DF2 sends the decryption key to the LEA, allowing it to decode previously sent encoded IRIs; otherwise, MF2/DF2 sends an empty decryption key, thereby indicating to the LEA to discard the previously sent encoded IRIs because it is not allowed to decode them. If the last SIP message of the SIP session does not contain the target's location, and most recently the target was within the LEA's jurisdiction, MF2/DF2 sends the decryption key to the LEA. The encryption key being changed each time the target's location (i.e., the PANI header) is received ensures that the LEA is enabled to decode only LI data intercepted within its jurisdiction. Since interception in the IMS domain can be correctly executed only if all IRI messages are received by the LEA, the LEMF may abort the interception related to that specific SIP session, discarding the related buffered IRI messages, if it receives an empty decryption key.

National regulation and LEA agreements may require that an intercepted communication that started inside the LEA's jurisdiction to continue when an LI target moves outside the LEA's jurisdiction. In this case, MF2/DF2 is configured to generate a single encryption key and a single test of whether the firstly obtained LI target's location is inside the LEA's jurisdiction determines whether all or none of the encrypted LI messages related to the communication session are to be decrypted (i.e., all if the LI target's location is inside the LEA's jurisdiction, none otherwise).

Figure 4:
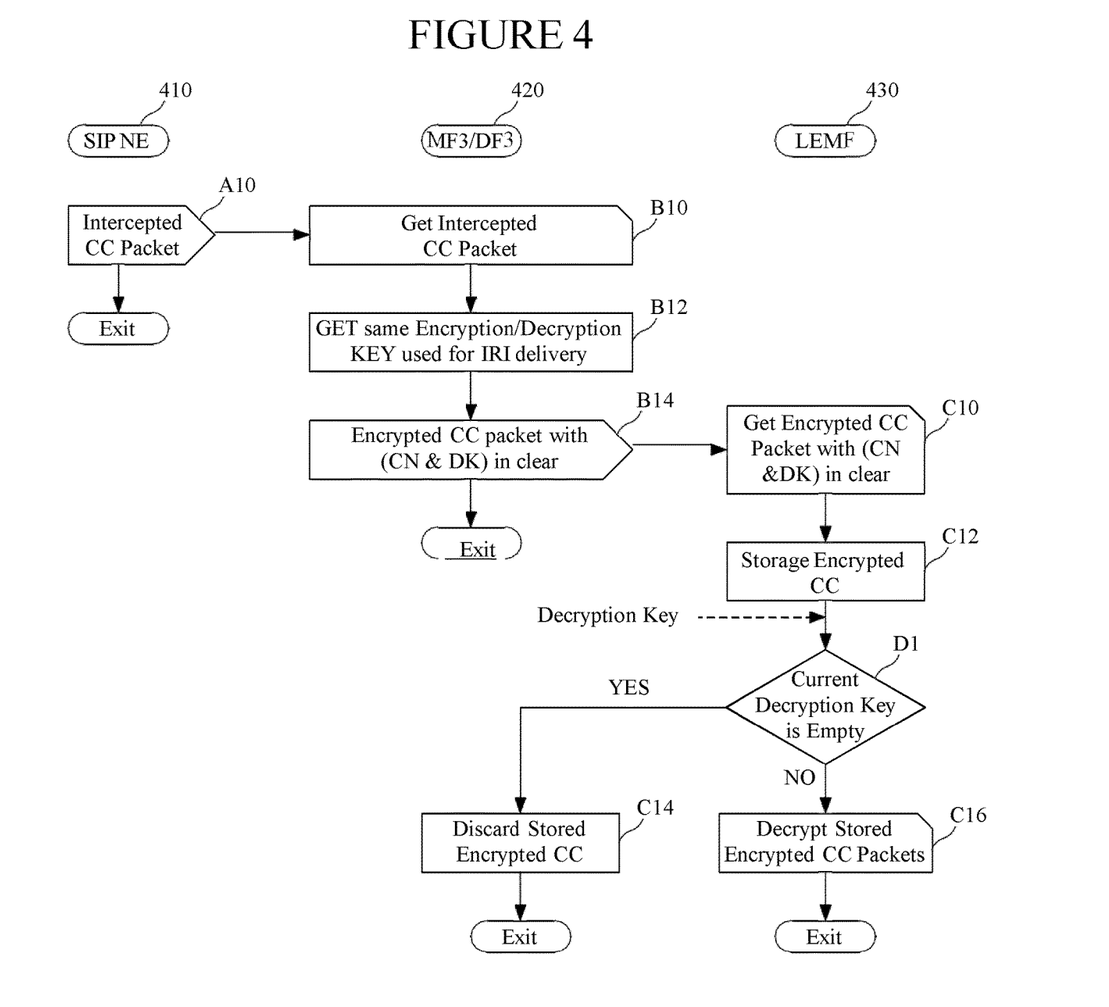
FIG. 4 is a flowchart illustrating CC delivery in IMS according to an embodiment.

FIG. 4 is a flowchart illustrating CC delivery in IMS according to an embodiment. This flowchart shows actions of three entities: a SIP intercepting network element 410, a modified CC mediation/delivery function (MF3/DF3) 420 and an LEMF 430 adapted to respond to the encryption mechanism. SIP NE 410 sends an intercepted CC packet to MF3/DF3 420 at A10.

Upon receiving the intercepted CC packet at B10, MF3/DF3 420 acquires the encryption/decryption key currently used by the MF2/DF2 function at B12. Then MF3/DF3 420 sends an LI message including encrypted CC with the correlation number (CN) and a decryption key name (DK) in clear. LEMF 430 receiving the LI message at C10, stores the encrypted CC at C12. Then, when the decryption key is received, LEMF 430 determines whether the received key is empty at D1. If the key is empty, the stored encrypted CC(s) are discarded at C14; otherwise the encrypted CC(s) are decrypted at C16.

Thus, the delivery of CCs to the LEA is performed similarly to IRI delivery. Since the CC packets do not include location information, setting up and updating the encryption key as well as sending the decryption key to LEMF is not managed by MF3/DF3.

Figure 5:
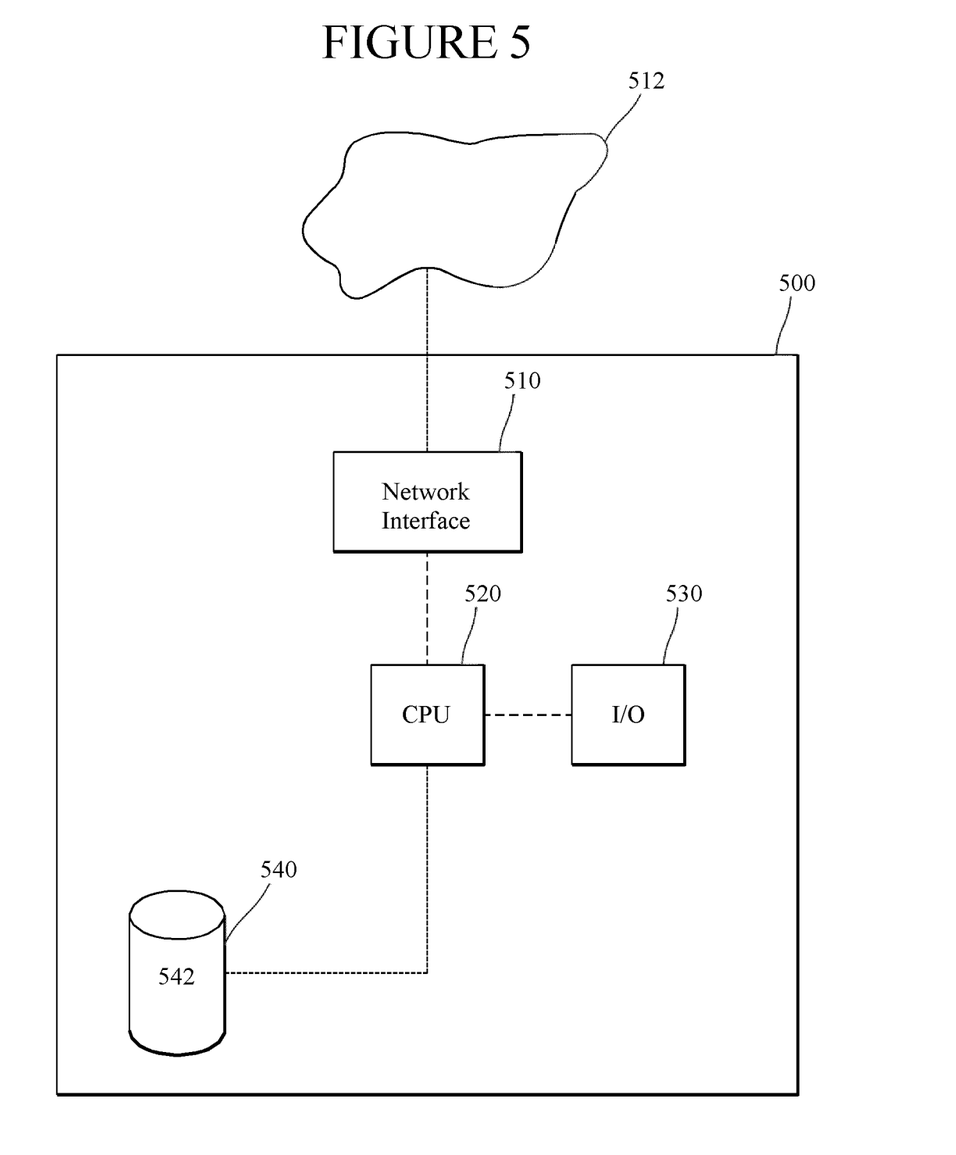
FIG. 5 is a schematic diagram of a device for LDI sending encrypted LI data according to an embodiment.

FIG. 5 illustrates a schematic diagram of a device 500, which is part of a network operator (i.e., a network operator device), configured to send encrypted LI data according to an embodiment. Device 500 includes a communication interface 510 and a data processing unit 520. The communication interface is configured to receive and transmit messages related to an LDI via network 512. Device 500 may also include a memory 540 and an operator interface 530. Memory 540 may store executable codes or a computer program 542, which, when executed by the processing unit, makes the processing unit perform any of the methods for managing location dependent lawful interception, sending encrypted LI data to a LEA.

Data processing unit 520 is configured to test various conditions related to intercepted messages of a communication session related to an LI target received via the communication interface such as: whether an intercepted message is the first or last message of the communication session, whether the intercepted message includes the target's location information, and whether the target is located in the LEA's jurisdiction according to the location information. Data processing unit 520 is configured to initialize and update an individual encryption mechanism, IEM, and an IEM version, and to send decryption information, or an indication to discard encrypted LI data, to the LEA.

Figure 6:
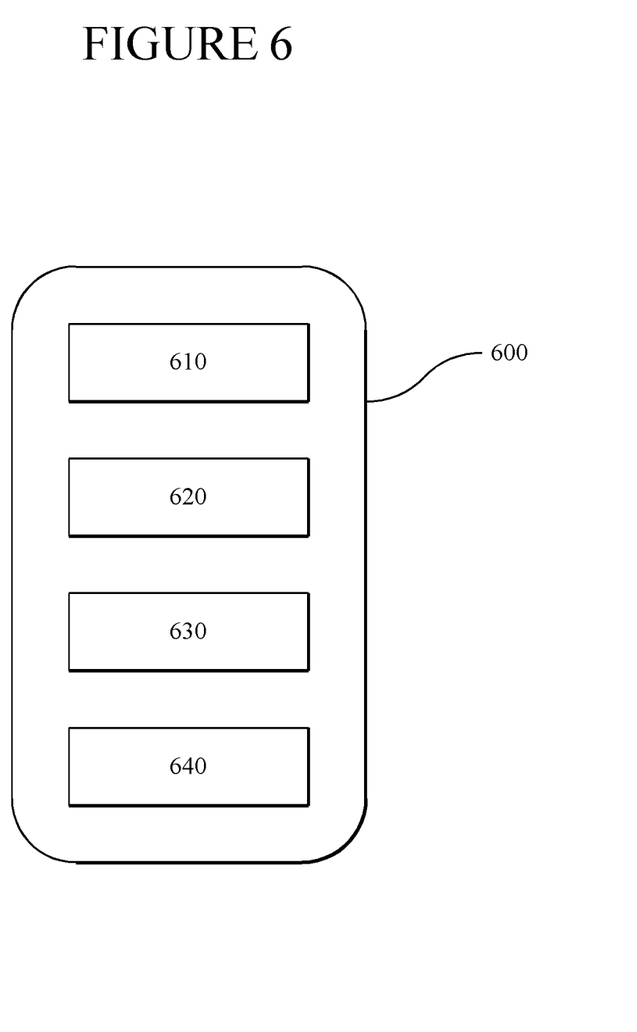
FIG. 6 is a device for LDI with encrypted data according to an embodiment.

FIG. 6 illustrates an alternative embodiment of the device illustrated in FIG. 5, here in the form of a device 600 for LDI with encrypted data according to an embodiment. Device 600 includes an interface module 610 configured to receive LI intercepted messages and to send LI messages or decryption information and an encryption module 620 configured to initialize an IEM (e.g., set an encryption/decryption key if a symmetric encryption algorithm is used) and an IEMV. Further, a decision module 630 is configured to determine whether an intercepted message is the first or the last message of the communication session, whether the location information is present, and whether, according to the location information, the target is within LEA's jurisdiction. Device 600 then includes an executive module 640 that generates the LI message(s) or forwards the decryption information as appropriate.

Figure 7:
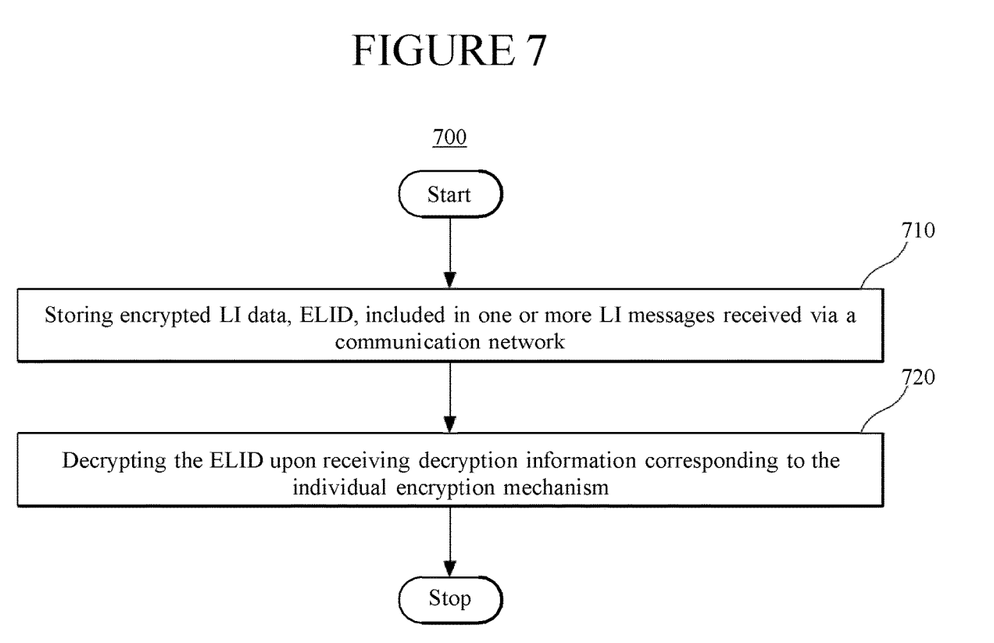
FIG. 7 is a flowchart of a method for managing LI data received encrypted at a LEA according to an embodiment.

From LEA's point of view, a LEA device (which may also perform LEMF) has to be configured to manage encrypted LI data (ELID). FIG. 7 is a flowchart of a method 700 for managing ELID according to an embodiment. Method 700 includes storing ELID included in one or more LI messages received via a communication network at 710. Each LI message includes an IEMV, LI correlation information and the ELID, which has been encrypted using an individual encryption mechanism identified by the IEMV. Method 700 further includes decrypting the ELID upon receiving decryption information corresponding to the individual encryption mechanism at 720. In one embodiment, the method also includes sorting the ELID based on the LI correlation information. The method may include discarding the stored ELID upon receiving a discarding indication. Alternative or additionally, the method may include discarding stored ELID after a predetermined time interval, or if another IEMV is included in LI messages with same LI correlation information as earlier messages without receiving decryption information. The individual encryption mechanism may be a symmetric key algorithm, the decryption information then being the encryption key.

Figure 8:
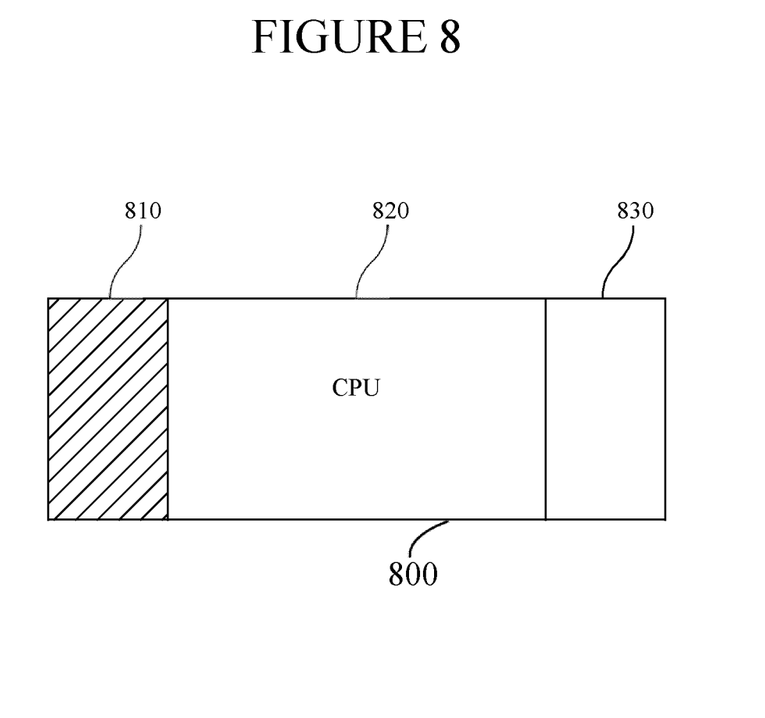
FIG. 8 is a schematic diagram of a device configured to manage encrypted LI data for LEA according to an embodiment.

FIG. 8 is a schematic diagram of a device 800 configured to manage encrypted LI data for LEA according to an embodiment. Device 800 has a communication interface 810 configured to receive LI messages and decryption information transmitted by a network operator device. Each of the LI messages includes an IEMV, a communication session identifier and encrypted LI data, ELID. Processor 820 stores ELID in memory 830 and decrypts ELID using the decryption information. Processor 820 may be configured to discard ELID upon receiving an indication (e.g., an empty decryption key) from the network operator. In one embodiment, processor 820 is configured to discard ELID if receiving an LI message with a new IEMV without receiving decryption information.

Figure 9:
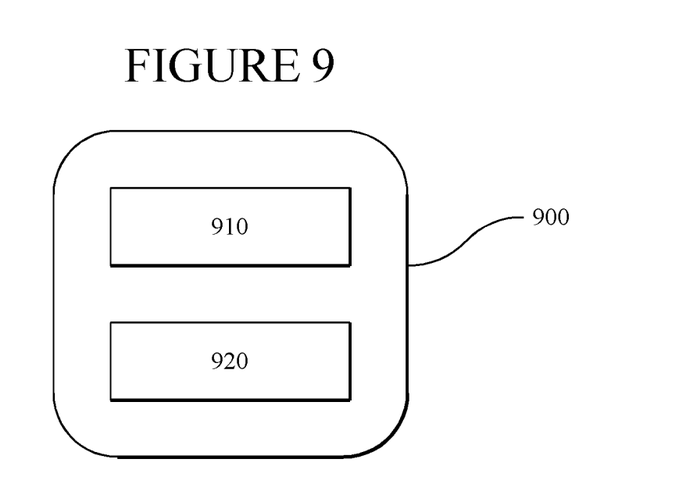
FIG. 9 is a device for managing encrypted LI data received at LEA according to an embodiment.

FIG. 9 is a device 900 for managing encrypted LI data received at LEA according to an embodiment. Device 900 includes an interface 910 configured to receive LI messages and decryption information from a network operator, and a processing module 920 configured to unpack the LI messages and store ELID with the IEMV and the communication session identified therein. Processing module 920 is further configured to decrypt ELID upon receiving decryption information.

The embodiments of LDI with encryption described in this section enable network operators to provide LDI functionality in multi-country scenarios while avoiding big investments for splitting network and nodes. IMS equipment and software providers are able with few modifications of the standard functions to provide LDI in spite of target's location potentially being unknown at the beginning of a communication session. With these embodiments, LEAs are able to intercept in multi-country scenarios with small impacts on LEMF but without forcing network operators to make large investments by splitting network and nodes in order to be compliant to LI regulations.

The disclosed embodiments provide methods and devices for location dependent interception with encryption of lawful intercepted data in communication networks. It should be understood that this description is not intended to limit the invention. On the contrary, the embodiments are intended to cover alternatives, modifications and equivalents, which are included in the spirit and scope of the invention. Further, in the detailed description of the embodiments, numerous specific details are set forth in order to provide a comprehensive understanding of the claimed invention. However, one skilled in the art would understand that various embodiments may be practiced without such specific details.

Figure 10:
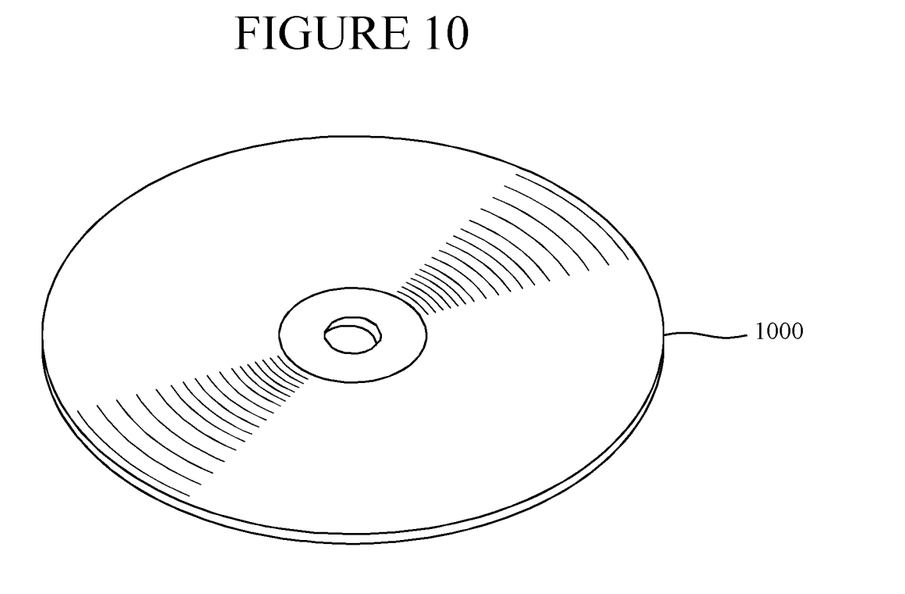
FIG. 10 depicts an electronic storage medium on which computer program embodiments can be stored.

As also will be appreciated by one skilled in the art, the embodiments may take the form of an entirely hardware embodiment or an embodiment combining hardware and software aspects. Further, the embodiments, e.g., the configurations and other logic associated with the charging process to include embodiments described herein, such as, the methods associated with FIGS. 1, 3, 4, 7 may take the form of a computer program product stored on a computer-readable storage medium having computer-readable instructions embodied in the medium. For example, FIG. 10 depicts a computer readable storage medium 1000 on which computer program embodiments can be stored. Any suitable computer-readable storage medium may be utilized, including hard disks, CD-ROMs, digital versatile disc (DVD), optical storage devices, or magnetic storage devices such as floppy disk or magnetic tape. Other non-limiting examples of computer-readable media include flash-type memories or other known memories.

Although the features and elements of the present embodiments are described in the embodiments in particular combinations, each feature or element can be used alone without the other features and elements of the embodiments or in various combinations with or without other features and elements disclosed herein. The methods or flowcharts provided in the present application may be implemented in a computer program, software or firmware tangibly embodied in a computer-readable storage medium for execution by a specifically programmed computer or processor.

What is claimed is:

1. A method for managing location dependent lawful interception (LI) by a network operator device in a communication network, the method comprising:
for each of one or more intercepted messages of a communication session related to an LI target,
if the intercepted message is identified as being a first message of the communication session, initializing an encryption mechanism (EM) and an encryption mechanism identifier (EMID);
transmitting one or more LI messages to a law enforcement agency (LEA) device, each of the one or more LI messages including the EMID, a communication session identifier, and LI data extracted from the intercepted message, wherein the LI data is encrypted using the encryption mechanism;
if location information is extracted from the intercepted message,
transmitting decryption information corresponding to the encryption mechanism to the LEA device if the location information indicates that the LI target is inside a specific geographical area (SGA), which is predefined for lawful interception by the LEA device, and
updating the encryption mechanism and the EMID; and
if the intercepted message is identified as a last message of the communication session and the location information is not extracted from the intercepted message, then transmitting the decryption information corresponding to the encryption mechanism to the LEA device if most recently intercepted location information of the LI target indicated that the LI target was inside the SGA or if no location information of the LI target was extracted from any of the one or more intercepted messages.

2. The method of claim 1, wherein the telecommunication network is an Internet Protocol (IP) Multimedia Subsystem (IMS).

3. The method of claim 1, wherein the initializing of the encryption mechanism, and the transmitting of the decryption information are performed by a delivery function for intercept related information (IRI), wherein the delivery function for IRI also transmits at least one of the one or more LI messages with IRI being the LI data that is encrypted using the encryption mechanism.

4. The method of claim 3, wherein a delivery function for content of communication (CC) transmits one of the one or more LI messages, which includes CC as the LI data encrypted using the encryption mechanism.

5. The method of claim 1, wherein the method further comprises:
if the location information is extracted from the intercepted message and indicates that the LI target is outside the SGA, transmitting an indication to discard the LI data encrypted using the encryption mechanism and the EMID to the LEA device and then updating the encryption mechanism and the EMID.

6. The method of claim 5, wherein the method further comprises:
if the intercepted message is identified as being the last message of the communication session and the most recently intercepted location information of the LI target indicates that the LI target is outside the SGA, then transmitting the indication to discard the LI data encrypted using the encryption mechanism and the EMID to the LEA device.

7. The method of claim 1, wherein the encryption mechanism uses a symmetric key chosen during the initializing of the encryption mechanism and updated after being transmitted to the LEA device as the decryption information, and the indication to discard the LI data is an empty encryption key.

8. A method for managing lawful interception (LI) data received encrypted by a device associated with a law enforcement agency (LEA), the method comprising:
storing encrypted LI data (ELID) included in one or more LI messages received via a communication network, each LI message including an encryption mechanism identifier (EMID), LI session correlation information, and the ELID, which has been encrypted using an encryption mechanism identified by the EMID; and
either decrypting the ELID after receiving decryption information corresponding to the encryption mechanism, the decryption information being sent to the LEA device only if, according to the LI target location, the LEA device has the right to decrypt the ELID; or
discarding the ELID if receiving an LI message with a new EMID without receiving decryption information.

9. The method of claim 8, wherein the method further comprises:
sorting the ELID based on the LI session correlation information.

10. The method of claim 8, wherein the method further comprises:
discarding the stored ELID upon receiving a discarding indication.

11. The method of claim 8, wherein the method further comprises:
discarding the stored ELID upon receiving an LI message with the LI session correlation information of a previously received LI message, and an EMID different from the EMID in the previously received LI message without receiving the decryption information.

12. The method of claim 8, wherein
the encryption mechanism is a symmetric key algorithm, and
the decryption information is the encryption key.

13. A network operator device for location dependent lawful interception (LI), the device comprising:
a network interface configured to receive one or more intercepted messages of a communication session related to an LI target and to transmit one or more LI messages to a law enforcement agency (LEA) device via a network; and
a data processing unit connected to the network interface and configured, for each of the one or more intercepted messages:
if the intercepted message is identified as being a first message of the communication session, to initialize an encryption mechanism and an encryption mechanism identifier (EMID),
to generate the one or more LI messages related to the LI target to be sent to an LEA device by the interface, each of the one or more LI messages including the EMID, a communication session identifier, and LI data extracted from the intercepted message, wherein the LI data is encrypted using the encryption mechanism,
to generate a message with decryption information corresponding to the encryption mechanism and the EMID to be transmitted to the LEA device by the interface if location information, which is extracted from the intercepted message, indicates that the LI target is inside a specific geographical area (SGA) that is predefined for lawful interception by the LEA device, and then to update the encryption mechanism and the EMID; and if the location information is not extracted from the intercepted and the intercepted message is identified as being a last message of the communication session, to generate a message with the decryption information corresponding to the encryption mechanism and the EMID to be transmitted to the LEA device if most recently intercepted location information of the LI target indicated that the LI target was inside the SGA or if no location information of the LI target was extracted from any of the one or more intercepted messages.

14. A device pertaining to a law enforcement agency (LEA) and being configured to manage encrypted lawful interception (LI) data, the device comprising:

a communication interface configured to receive LI messages and decryption information, each of the LI messages includes an encryption mechanism identifier, a communication session identifier, and encrypted LI data (ELID); and a processor connected to the communication interface and configured to either store the ELID in a memory and to decrypt the ELID using the decryption information only if, according to the target location, the LEA device has the right to decrypt the ELID or discard the ELID if receiving an LI message with a new ELID without receiving decryption information.

* * * * *